United States Patent [19]

Lespagnol et al.

[11] Patent Number: 5,214,648
[45] Date of Patent: May 25, 1993

[54] COMPLEMENTARY COMMUNICATION SYSTEM IN THE NO-CONNECTION MODE FOR ASYNCHRONOUS TIME-DIVISION NETWORK

[75] Inventors: Albert Lespagnol; Jean-Paul Quinquis, both of Perros-Guirec; Michel Servel, Lannion, all of France

[73] Assignee: French State represented by the Minister of the Post, Telecommunications and Space, Issy-Les-Moulineaux, France

[21] Appl. No.: 542,826

[22] Filed: Jun. 25, 1990

[30] Foreign Application Priority Data

Jun. 30, 1989 [FR] France ................................ 89 08762

[51] Int. Cl.[5] .............................................. H04J 3/24
[52] U.S. Cl. .................................... 370/94.1; 370/60; 370/85.15
[58] Field of Search ........................ 370/60, 60.1, 94.1, 370/94.2, 58.1, 58.2, 85.15, 58.3, 85.5, 85.12

[56] References Cited

U.S. PATENT DOCUMENTS

| | | | |
|---|---|---|---|
| 4,751,697 | 6/1988 | Hunter et al. | 370/85.15 |
| 4,879,550 | 11/1989 | Hino et al. | 370/85.12 |
| 4,901,312 | 2/1990 | Hui et al. | 370/85.12 |
| 4,956,841 | 9/1990 | Judeinstein et al. | 370/60.1 |
| 5,067,123 | 11/1991 | Hyodo et al. | 370/60 |

Primary Examiner—Douglas W. Olms
Assistant Examiner—Alpus H. Hsu
Attorney, Agent, or Firm—Laubscher & Laubscher

[57] ABSTRACT

A communication system is designed to equip an asynchronous time-division network and to enable terminals linked to the network to communicate in the no-connection mode. The system comprises a ring management device and components distributed among the terminals and interfacing the terminals with a virtual ring for managing the production, reception and transmission of data cells. The ring management device is linked via the network to each of the terminals in order to control the connection/disconnection requests coming from the terminals and to supply information concerning cell routing to the terminals linked to the ring. A terminal has a particular role as a pilot for regulating the rate of the data cells in the virtual ring. Another purpose of the pilot terminal is to eliminate the altered cells. Furthermore, there is provided in each of the terminals a device for limiting its rate to a maximum value.

4 Claims, 4 Drawing Sheets

COMPLEMENTARY COMMUNICATION SYSTEM IN THE NO-CONNECTION MODE FOR ASYNCHRONOUS TIME-DIVISION NETWORK

BACKGROUND OF THE INVENTION

1. Statement of the Invention

This invention comes within the scope of asynchronous time-division switching. More specifically, the invention relates to communication systems associated with asynchronous time-division networks authorizing no-connection mode communications between terminals.

2. Brief Description of the Prior Art

Asynchronous time-division networks are designed to supply with-connection mode communications, i.e. a link with allocation of resources must necessarily be set up between terminals prior to each transmission of data. Local Area Networks (LAN) provide services of the no-connection type and a terminal can at all times transmit data to another terminal by simply specifying the address of the destination terminal without any need for prior setting-up of a link. A no-connection service is essential for data transmission applications for which the following are not known a priori:

With which other terminals will the calling terminal subsequently exchange information?

What volume of information will said calling terminal transmit, for how long and at what rate? and At what moments will the calling terminal be transmitting?

In fact, such unpredictability at the parameter level of a communication makes the profitability of with-connection service relatively low. The load factor of a link is unknown and, in the event of a transmission request, the setting-up time of the link risks being disproportionate to the period of transmission of information.

The asynchronous time-division technique is generally considered to be a very good technical solution for switching on account of its speed, and its utilization is considered for the constitution of future wideband integrated services digital networks (WB-ISDN). Given the qualities and assets of this technique, it is desirable that it be able to meet the different communication needs. An asynchronous time-division network must be able to meet the demands of no-connection services if only for it to be also utilizable in the private field of Local Area Networks.

OBJECT OF THE INVENTION

The main object of this invention is to remedy the preceding disadvantages, particularly to provide complementary communication systems designed to equip asynchronous time-division networks and to provide them with no-connection type functionalities.

SUMMARY OF THE INVENTION

Accordingly, there is provided a communication system embodying the invention to equip an asynchronous time-division network and to enable terminals to communicate in the no-connection mode via said network. The system comprises means for managing the setting up and operating of a virtual communication ring to which are connected terminals likely to communicate with one another in the no-connection mode and via which are transmitted first data cells containing blocks of information to be transmitted. The managing means includes means connected via the network to each of the terminals to control connection/disconnection requests coming from the terminals, thereby supplying information relating to cell routing to the terminals connected to the network, and means distributed in the terminals and interfacing the terminals with the virtual ring for managing the production, reception and transmission of the first data cells.

The means distributed in the terminals preferably comprises in each of the terminals demultiplexing and multiplexing means for separating the first data cells of the virtual ring and second data cells not belonging to the virtual ring and carried by same asynchronous time-division multiplex ways of the network, means for detecting and receiving the first data cells destined for the terminal, means for reading and memorizing in chronological order of arrival blocks of information and source addresses read in the first data cells received, means for retransmitting in the virtual ring the filled first data cells destined for other terminals, and means for including blocks of information to be transmitted and addresses in unfilled first data cells thereby transmitting first cells with said blocks and addresses in the virtual ring.

BRIEF DESCRIPTION OF THE DRAWINGS

Further features and advantages of the invention will be apparent from the following particular description of several Preferred embodiments of this invention as illustrated in the corresponding accompanying drawings in which.

DESCRIPTION OF THE PREFERRED EMBODIMENTS

Figure 1:
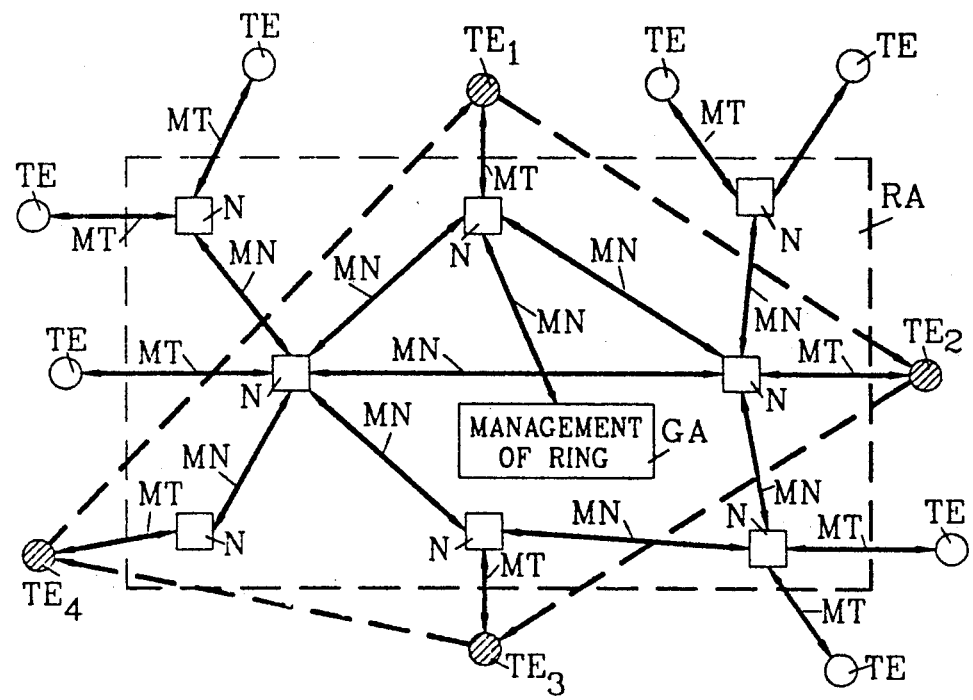
FIG. 1 schematically shows the architecture of an asynchronous time-division network equipped with a communication system embodying the invention.

In reference to FIG. 1, a communication system in the no-connection mode and in virtual ring embodying the invention is installed in an asynchronous time-division network RA. Plural terminals TE are connected to switching nodes N. Bidirectional asynchronous time-division multiplex ways MN connect the nodes N to one another and form a network of any structure whatever. Other bidirectional asynchronous time-division multiplex ways MT connect the terminals TE to the nodes N. At the moment under consideration in FIG. 1, four terminals $TE_1$ to $TE_4$ are connected via the virtual ring. Data transmission in the virtual ring is one-way. The routing of data via the virtual ring is shown in FIG. 1 by means of arrows drawn in broken lines. A ring management device GA is provided in the network RA in order to administrate the virtual ring. The device GA is connected to a node of the network RA and is integrated into said network. According to another embodiment, the device GA is outside of the network proper and is in the form of a terminal TE dedicated to the function of administration of the virtual ring.

In addition to the data cells relating to with-connection links, a multiplex way MT connecting a terminal $TE_n$ of the virtual ring carries data cells CA of fixed length at a predetermined rate in each transmission direction. The data cells CA belong to the virtual ring and relate to no-connection links.

Figure 2:
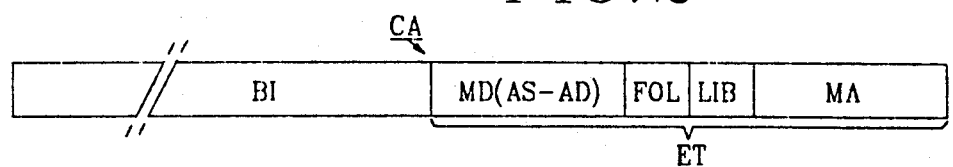
FIG. 2 shows the structure of the data cells carried in a virtual ring of the communication system embodying the invention.

The structure of a cell CA is shown in FIG. 2. A cell CA is comprised of a label ET and of a block of information BI.

The label ET comprises a routing word MA, a discrimination word MD, and two signalling bits LIB and FOL.

The routing word MA enables the cells to be routed through the network RA. Generally speaking, a cell CA received by a terminal $TE_n$ of the ring and including a routing word $MA_n$ is retransmitted by the terminal with another routing word $MA_{n+1} \neq MA_n$ to the following $TE_{n+1}$ of the virtual ring. Upon each modification of the virtual ring by connection or disconnection of one or plural terminals $TE_n$ in the network, the ring management device GA controls the loading of new routing tables in the different nodes N of the network RA and communicates the corresponding routing words MA to the terminals of the virtual ring.

The discrimination word MD contains a source address AS and a destination address AD respectively corresponding to an address of the terminal TE having included data in the block BI of the cell and an address of the terminal TE for which said data are destined.

Figure 3:
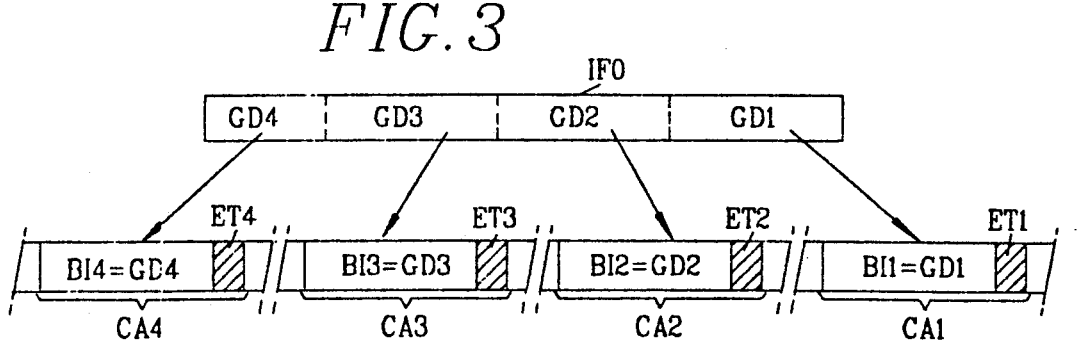
FIG. 3 shows the breakdown of an information frame to be transmitted into several blocks of information and the insertion of the different blocks in the cells of the ring.

In reference to FIG. 3, an information frame IFO transmitted by a terminal $TE_n$ in the no-connection mode to another terminal $TE_m$ of the ring is of any length and is broken up into plural groups of data e.g. GD1 to GD4, which are respectively included in blocks of information BI1 to BI4 respectively of cells CA1 to CA4 successively transmitted by the terminal $TE_n$.

The bit LIB in the state "1" indicates that the cell CA is unfilled and can receive a block of information BI. The bit LIB in the state "0" indicates that the cell CA is filled and is carrying a valid block of information BI.

The bit FOL is put in the state "1" by the terminal $TE_n$ having deposited a data group GD in the cell CA. A terminal $TE_p$ plays a particular role which is to regulate the rate in the virtual ring and to control the cells carried by the ring. The terminal $TE_p$ is hereinafter called "pilot terminal". The pilot terminal $TE_p$ systematically positions in the state "0" the bits FOL of all the filled cells CA (LIB="0") it receives prior to retransmitting them in the virtual ring. When the pilot terminal TE receives a filled cell CA with the bit FOL="0", it deducts that the discrimination word MD is incorrect since said cell CA has covered a lap of the ring and a maximum of two laps without any of the terminals $TE_n$ recognizing the cell as being destined for it, and then the pilot terminal $TE_p$ eliminates the cell CA by not retransmitting it in the virtual ring.

Figure 4:
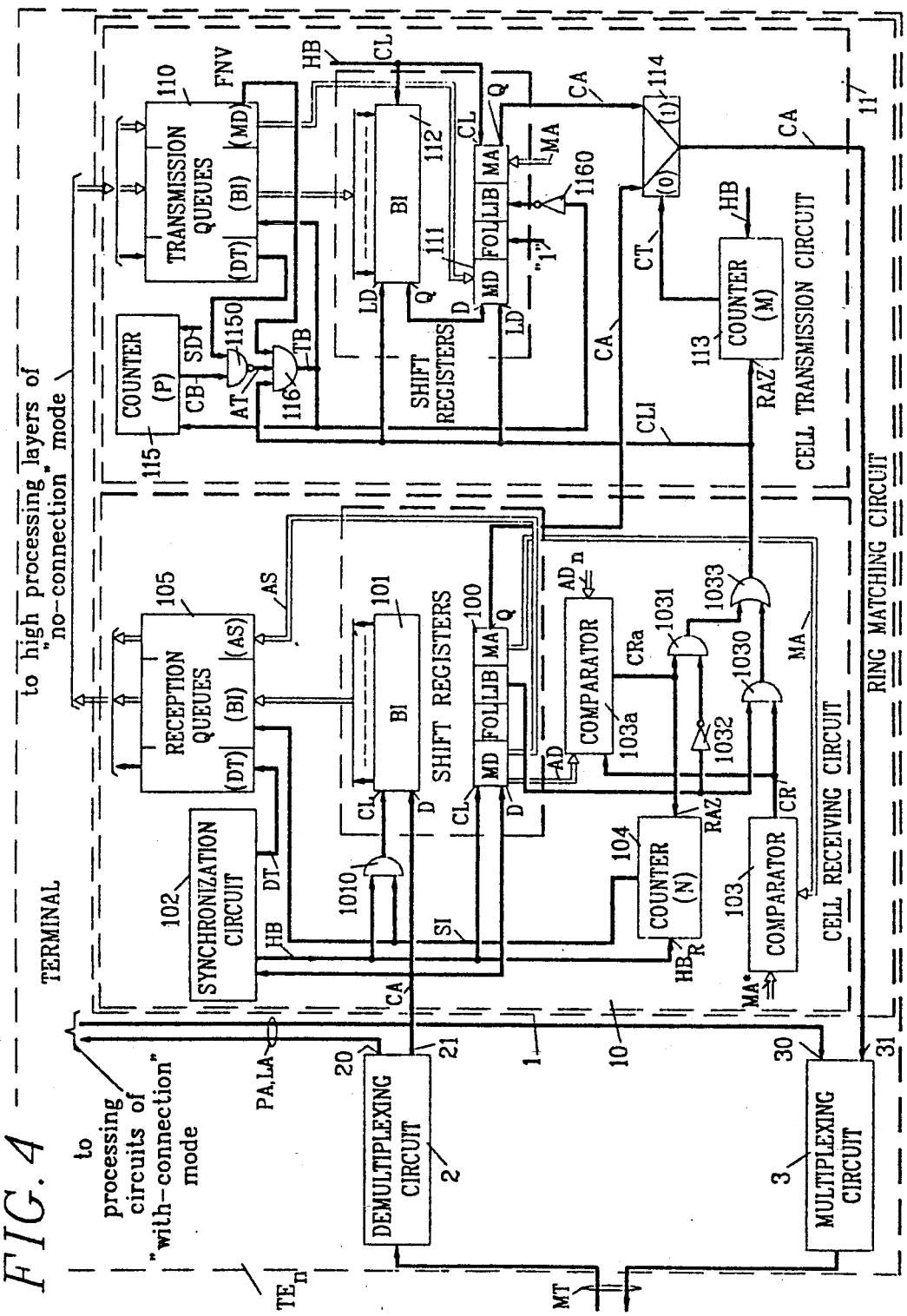
FIG. 4 is a block diagram of a ring matching circuit included in each of the terminals connected to the network.

In reference to FIG. 4, each of the terminals $TE_n$ is equipped with a ring matching circuit 1 which is now described. The ring matching circuit 1 comprises a cell receiving circuit 10 and a cell transmission circuit 11.

In the terminal $TE_n$, incoming and outgoing multiplex ways of bidirectional multiplex way MT are respectively connected to a demultiplexing circuit 2 and to a multiplexing circuit 3. The purpose of the demultiplexing and multiplexing circuits 2,3 is essentially to separate first and second paths respectively corresponding to the data cells CA belonging to the virtual ring and to other data cells PA not belonging to the virtual ring. First output and input, 20 and 30, respectively of the circuits 2 and 3 are connected to a bidirectional link LA carrying cells PA to corresponding processing circuits of the terminal $TE_n$. Second output and input, 21 and 31, of the circuits 2 and 3 are respectively connected to the cell receiving and cell transmission circuits 10, 11.

The cell receiving circuit 10 essentially comprises input shift registers 100 and 101, a synchronization circuit 102, word comparators 103 and 103a, a counter 104, and reception queues 105.

The cells CA are supplied in series form from the demultiplexing circuit 2 and are applied to serial data inputs D of the shift registers 100 and 101 and to a corresponding input of the synchronization circuit 102.

The synchronization circuit 102 receives the cells CA and issues at output a bit timing clock signal HB and a frame start signal DT for signalling in the state "1" the reception of a first cell CAI (FIG. 3) carrying a first data group BD1 (FIG. 3) of an information frame IFO transmitted via the ring.

The clock signal HB is applied directly to a clock input CL of the shift register 100 and, via an AND gate, 1010, to another clock input CL of the shift register 101.

The cell bits CA are successively loaded and in a continuous manner in the shift register 100. The register comprises four fields respectively corresponding to the routing word MA, the signalling bit LIB, the signalling bit FOL, and the discrimination word MD.

The purpose of the comparator 103 is to detect the loading in the register 00 of a label ET in order to signal the reception of a data cell CA. The comparator 103 receives at first inputs a routing word portion MA* common to all the routing words MA included in the cells CA. Second inputs of the comparator 103 are connected to parallel outputs of the register 100 corresponding to the field of the word MA. A pulse CR="1" is supplied at output by the comparator 103 when a cell CA is detected. The pulse CR is applied at a first input of an AND gate 1030 and at an activation input of the comparator 103a.

The comparator 103a is activated by the pulse CR="1" supplied by the comparator 103. The comparator 103a detects in the register 100 the discrimination words MD containing a destination address AD identical to an address $AD_n$ corresponding to the terminal $TE_n$. When an address $AD=AD_n$ is detected in the field of the corresponding word MD of the register 100, a cell CA destined for the terminal $TE_n$ is being received and the comparator 103a derives a pulse CRa="1". The pulse CRa is applied to a resetting input RAZ of the counter 104 and to a first input of an AND gate 1031.

The counter 104 is a modulo-N binary counter, where N is the length in number of bits of the block of information BI in a cell CA. The content of the counter 104 is cyclically incremented by the clock signal HB. The counter 104 locks when its content is reaching the value N and counter 104 is unlocked and zero-set by the pulse CRa="1". A signal SI is derived by the counter 104.

The signal SI is in the state "0" and in the state "1" respectively when the counter 104 is locked and when it is unlocked.

When a cell CA destined for the terminal $TE_n$ is being received, the pulse CRa="1" unlocks the counter 104 and the signal SI comes into the state "1". The signal SI="1" opens the AND gate 1010 and the clock signal HB is applied to the input CL of the register 101. The block of information BI of the cell CA being received is then loaded bit by bit in the register 101. When the signal SI jumps to the state "0", the entire block of information SI of the cell CA is loaded in the register 101. The falling edge, from "1" to "0", of the signal SI controls in the reception queues 105 the loading of the state of the frame start signal DT that is supplied by the synchronization circuit 102, of the block of information BI that is supplied by corresponding parallel outputs from register 101, and of the source address AS that is contained in the discrimination word MD and supplied by corresponding parallel outputs from the register 100. The reception queues 105 are of the FIFO type and store information DT, BI and AS in chronological order of arrival of the cells CA. The information stored in the reception queues 105 are then transferred to high processing layers in terminal $TS_n$.

A logic inverter 1032 and an OR gate 1033 are also provided in the cell receiving circuit 10 and are associated with the AND gates 1030 and 1031 thereby deriving a signal CLI destined for the cell transmission circuit 11. In the state "1", the signal CLI indicates to the transmission circuit 11 that an unfilled cell CA is available and is ready to receiving a block of information BI to be transmitted in the virtual ring. The signal CLI is produced in the cell receiving circuit 10 as a function of the signals CR, CRa and LIB and is in the state "1" when an unfilled cell CA is received in the circuit 10 or when a filled cell CA destined for the terminal $TE_n$ is received and becomes unfilled after the transfer of the block of information BI it contains to the reception queues 105. The signal LIB is applied directly to a second input of the AND gate 1030 and via the inverter 1032 to a second input of the AND gate 1031. Outputs of the AND gates 1030 and 1031 are respectively connected to first and second inputs of the OR gate 1033. The OR gate 1033 supplies the signal CLI.

The cell transmission circuit 11 essentially comprises transmission queues 110, output shift registers 111 and 112, a first counter 113, a multiplexer 114, and a second counter 115.

The information DT, BI and MD transmitted by the high processing layers in terminal $TE_n$ are stored in the transmission queues 110. In addition to the information DT, BI and MD, the queues 110 issue a signal FNV indicating in the state "1" that the queues 110 are not unfilled, and in the complementary state FNV="0" that the queues 110 are unfilled.

The register 111 comprises four fields respectively corresponding to the routing word MA, to the signalling bit FOL, to the signalling bit LIB, and to the discrimination word MD. The register 112 comprises a single field destined to receive a block of information BI. The two registers 111 and 112 are series-connected. A serial data output Q of the register 112 is connected to a serial data input D of the register 111. A bit timing clock signal HB is applied at clock inputs CL of the registers 111 and 112. The information MD and BI supplied by the transmission queues 110 are applied at corresponding parallel inputs respectively of the registers 111 and 112. The routing word MA is applied at corresponding parallel inputs of the register 111. A parallel input of the register 111 corresponding to the field of the bit FOL is put in the state "1". Another parallel input of the register 111 corresponding to the field of the bit LIB is connected to an output of an AND gate 116, via a logic inverter 1160, and receives a pulse TB.

The counter 113 is a modulo-M binary counter, where M is the length in number of bits of a cell CA. The contents of the counter 113 are cyclically incremented by the clock signal HB. The counter 113 locks when its contents reach the value M and it is unlocked and zero-set by the pulse CLI="1" transmitted by the cell receiving circuit 10 when an unfilled cell CA is available. A signal CT is issued by the counter 113 and is applied to a control input of the multiplexer 114. The signal CT is in the state "0" and in the state "1" respectively when the counter 113 is locked and when it is unlocked.

When the pulse CLI is not active and is therefore in the state "0", the output 21 of the demultiplexing circuit 2 should be looped to the input 31 of the multiplexing circuit 3 so as to retransmit the filled cells CA received by the reception circuit 10 to the asynchronous multiplex way MT. In the above case in point, the counter 113 remains locked and the signal CT in the state "0" selects a first input of the multiplexer 114 connected to a data output Q of the register 100 in the receiving circuit 10. An output of the multiplexer 114 is connected to the input 31 of the multiplexing circuit 3 and the filled cells CA are transmitted from the output 21 of the circuit 2 to the input 31 of the circuit 3 via the register 100 and the multiplexer 114.

When the pulse CLI comes into the state "1", i.e. when an unfilled cell CA is available, the counter 113 is unlocked and zero-set and the signal CT switches to the state "1" for a period corresponding to the transmission of a cell CA. The signal CT=1" selects a second input of the multiplexer 114, input which is connected to a serial data output Q of the register 111. Depending on the case, an unfilled cell CA or a cell CA containing a block of information BI outgoing from the queues 110 is transmitted to the input 31 of the circuit 3 by the registers 111 and 112.

The pulse CLI is applied to load control inputs LD of the registers 111 and 112 and to a first input of the AND gate 116. Second and third inputs of the AND gate 116 respectively receive a signal AT and the signal FNV supplied by the transmission queues 110. An output of the AND gate 116 issues the pulse TB which is applied to a parallel input of the register 111 via inverter 1160. The pulse TB is also applied to a control input of the transmission queues 110 and by a state "1" controls the transmission of the information BI and MD to the corresponding parallel inputs of the registers 111 and 112.

When the AND gate 116 is closed by one of the signals AT or FNV in the state "0", the pulse CLI does not go through the AND gate 116 and the pulse TB="1" is then not produced. The information BI and MD therefore remain in the queues 110 and are not loaded into the registers 111 and 112 and the pulse CLI controls the register 111 the loading of a bit="1", of a bit LIB=TB="1" and of the routing word MA, and an unfilled cell CA is transmitted to the multiplex way MT.

When the AND gate 116 is open, AT.FNV="1", the pulse TB="1" controls the loading of the bit LIB=TB="0" and of information BI and MD in the registers 111 and 112. A filled cell CA is then transmitted to the multiplex way MT.

The signal AT is produced by means in the form of the counter 115 and a NAND gate 1150 for regulating the transmission rate of the terminal.

The counter 115 is a binary counter. The counter 115 is incremented by the pulses TB="1" that are applied to its clock input. When a maximum value P is reached in the counter 115, the latter locks and issues a signal CB in the state "1". The counter 115 is periodically reset by a low-frequency clock signal SD with period T. The signal CB is applied to a first input of the NAND gate 1150. A second input of the gate 1150 receives the frame start signal DT outgoing from the transmission queues 110. At output, the NAND gate 1150 issues the signal AT.

The value P represents a credit in number of blocks of information allocated to the terminal $TE_n$ to avoid the latter monopolizing all the virtual ring's rate resources. When the terminal $TE_n$ has used up its credit, the signal CB comes into the state "1". The signal CB is not taken into account and only controls the switching of the signal AT from the state "1" into the state "0" when the last block of information BI of the packet being transmitted has been transmitted, i.e. when a transition to the state "1" of the frame start signal DT has been detected.

Figure 5:
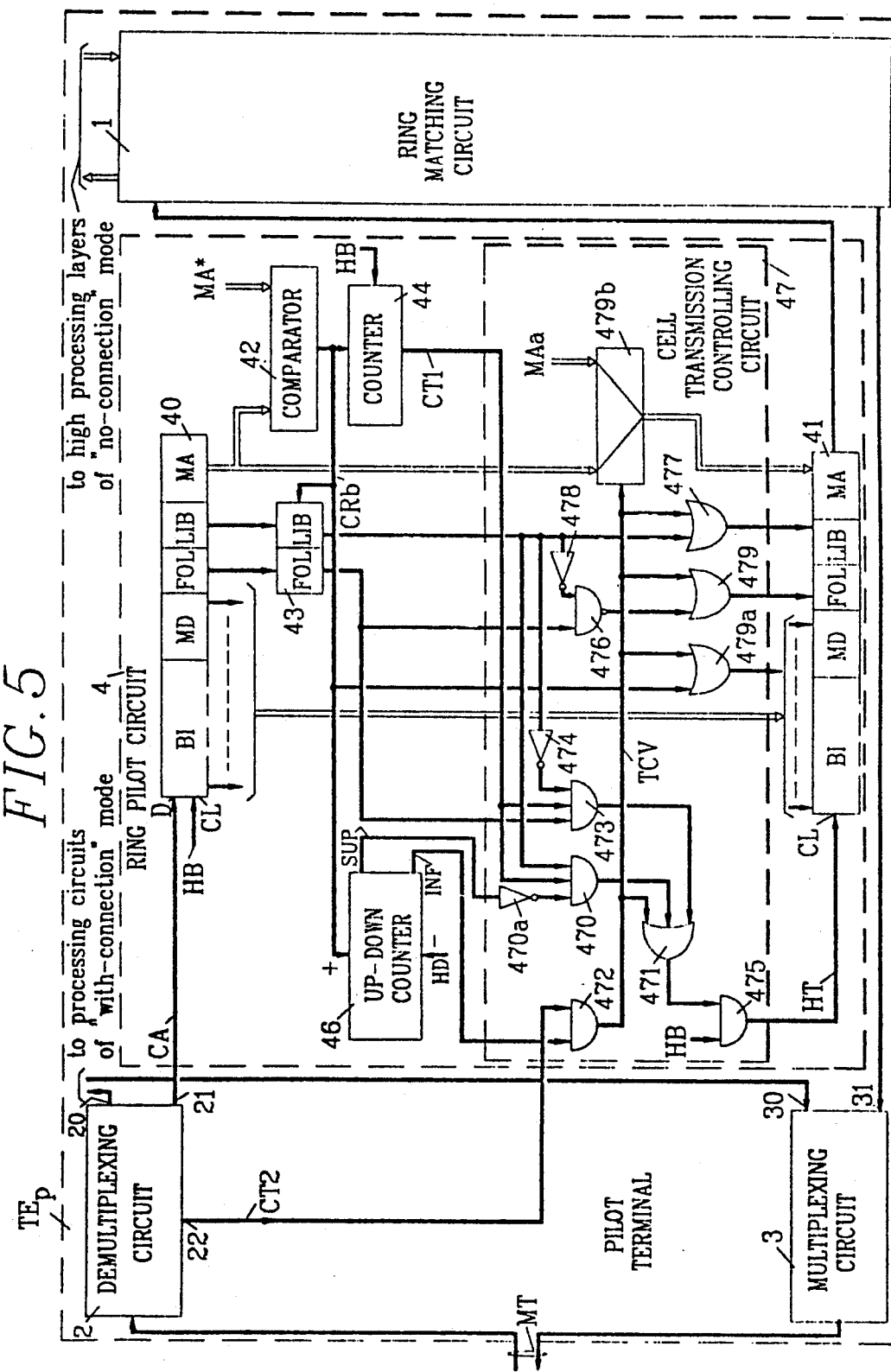
FIG. 5 is a block diagram of a ring pilot circuit included in each of the terminals connected to the network.

In reference to FIG. 5, in the pilot terminal $TE_p$ is provided a ring pilot circuit 4 which is interposed between the demultiplexing circuit 2 and the ring matching circuit 1 included in the pilot terminal $TE_p$.

A main function of the ring pilot circuit 4 is to regulate the rate of the cells CA in the virtual ring by producing and eliminating unfilled cells CA depending on the case. Another function of the ring pilot circuit 4 is to control the cells CA carried in the virtual ring thereby eliminating the filled data cells having accomplished more than a predetermined number of laps in the virtual ring and also avoiding altered cells CA being unable to circulate indefinitely in the ring.

The ring pilot circuit 4 essentially comprises an input shift register 40, an output shift register 41, a word comparator 42, a buffer register 43, a counter 44, an up-down counter 46, and a cell transmission controlling circuit 47.

The cells CA transmitted from the demultiplexing circuit 2 are received at a serial data input D of the input shift register 40. A bit timing clock signal HB is applied to a clock input CL of the input register 40.

The shift registers 40 and 41 are analogous and each comprises M stages so as to enable the loading of a complete cell CA. The input register 40 receives the cells CA in serial form and issues them in parallel form. The output register 41 loads the cells CA in parallel form and transmits them in serial form to the ring matching circuit 1. The parallel outputs of the input register 40 corresponding to the fields of the block BI and the word MD are respectively connected to corresponding parallel inputs of the output register 41.

The purpose of the comparator 42 is to detect the loading of a cell CA into the input register 40. First inputs of the comparator 42 are connected to parallel outputs of the input register 40 corresponding to the field of the routing word MA. second inputs of the comparator 42 receive the routing word portion MA* common to all routing words MA included in the cells CA of the virtual ring. The comparator 42 supplies a pulse CRb="1" when a cell CA is loaded in the register 40.

The purpose of the buffer register 43, which is of the conventional type, is to memorize between two receptions of cells CA the states of the bits FOL and LIB of the last cell CA received. The loading of the states of the bits FOL and LIB in the register 43 is controlled by the pulse CRb.

The counter 44 is a modulo-M binary counter. The counter 44 operates in a similar manner to the counters 104 and 113 shown in FIG. 4. The purpose of the counter 44 is to produce an impulse signal CT1, shown in FIG. 6, with a period equal to the transmission period marked D of a cell CA. The unlocking and zero-setting of the counter 44 are controlled on a rising edge of the pulse CRb="1". The signal CT1 produced by the counter 44 is supplied to the cell transmission controlling circuit 47.

The purpose of the up-down counter 46 is to determine whether the actual rate DE of the cells in the virtual ring is higher or lower than a predetermined set rate DR that is required in the virtual ring. To do so, incrementation+and decrementation−clock inputs of the up-down counter respectively receive the pulses CRb="1" and a rate clock signal HD. The rate clock signal HD has a frequency corresponding to the required rate DR. The counter issues two signals INF and SUP at output. The signal INF is in the active state "1" when the actual rate DE is lower than the required rate DR, and unfilled cells CA must then be produced. The signal SUP is in the active state "1" when the actual rate DE is higher than the required rate DR, and filled cells CA must then be suppressed.

The cell transmission controlling circuit 47 comprises plural logic gates and a multiplexer 479b.

Figures 6, 7:
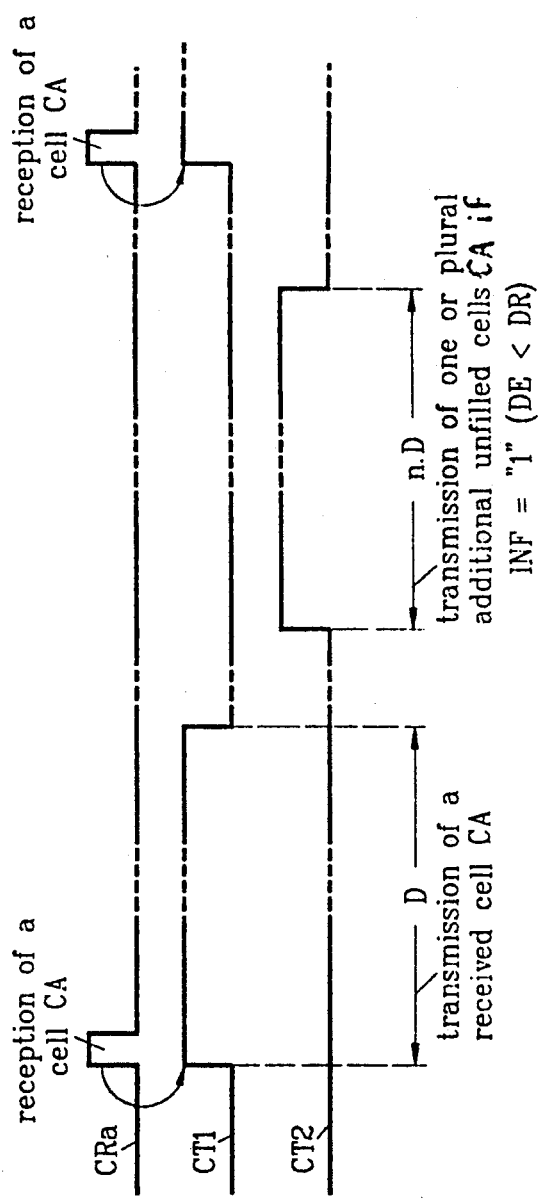
FIG. 6 is a timing diagram showing the insertion of an unfilled cell in the virtual ring of the communication system.
FIG. 7 is a truth table relating to the operation of the ring pilot circuit.

The signal SUP is applied to a first input of an AND gate 470 via an inverter 470a. Second and third inputs of the gate 470 respectively receive the signal CT1 and the bit LIB memorized in the buffer register 43. An output of the gate 470 is connected to a first input of a first OR gate 471. A second AND gate 472 receives at first and second inputs the signal INF and a signal CT2 respectively. The signal CT2, shown in FIG. 6, is supplied by an output 22 of the demultiplexing circuit 2 and indicates in the state "1" that a free time interval is available to transmit an unfilled cell CA, if required. An output of the gate 472 is connected to a second input of the OR gate 471. At a first input, a third AND gate 473 receives via an inverter 474 the bit LIB memorized in the buffer register 43. Second and third inputs of the gate 473 respectively receive the signal CT1 and the bit FOL memorized in the buffer register 43. An output of the gate 473 is connected to a third input of the OR gate 471. An output of the gate 471 is connected to a first input of a fourth AND gate 475 of which a second input receives the clock signal HB. An output of the AND gate 475 is connected to a clock input CL of the output register 41 and issues a transmission control clock signal HT.

The bits FOL and LIB supplied by the buffer register 43 are also applied respectively to first inputs of a first NAND gate 476 and of a second OR gate 477. The bit LIB is also applied to a second input of the gate 476 via an inverter 478. An output of the gate 476 is connected to a first input of a third OR gate 479. A fourth OR gate 479a receives at a first input the pulse CRb supplied by the comparator 42. Second inputs of the gates 477, 479 and 479a receive a signal TCV supplied by the AND gate 472. The signal TCV is also applied to a control input of the multiplexer 479b. Outputs of the OR gate 479 and 477 are respectively connected to parallel inputs of the register 41 corresponding to fields of the bits FOL and LIB. An output of the OR gate 479a controls in the output register 41 the loading of the information applied to the parallel inputs of the register 41.

The purpose of the multiplexer 479b is to supply a routing word MAa to be loaded in the corresponding field of the output register 41 when an additional unfilled cell CA (INF="1") needs to be produced and transmitted and when the contents of the field of the routing word MA int he input register 40 are not valid. First inputs of the multiplexer 479b are connected to parallel outputs of the input register 40 corresponding to the field of the routing word MA. Second inputs of the multiplexer 479b receiving the routing word MAa. Outputs from multiplexer 479b are connected to parallel inputs of the output register 41 corresponding to the field of the routing word MA.

In the state "1", the signal TCV=INF.CT2 controls the transmission of one or plural, n≧1, additional unfilled cells CA. As is apparent in FIG. 6, the transmission of the additional unfilled cells CA occurs between two receptions of cells CA in the input register 40.

In reference to FIG. 7, an incoming cell CAe and an outgoing cell CAs are considered, and different cases in point regarding the operation of the ring pilot circuit 4 are shown as a function of the states of the bits FOL and LIB of the incoming cell CAe and of the states of the signals SUP, INF, CT1, CT2, HT and TCV. The notation CAs=CAe(FOL="0") means that the transmitted outgoing cell CAs is identical to the corresponding incoming cell CAe except for the bit FOL which in the case of the cell CAs is in the state "0". The notation CAs=CAe(FOL.LIB="1") indicates that for the outgoing cell the bits FOL and LIB are both in the state "1". The notation CAs="0 . . . 0" means that a sequence of state "0" is transmitted in response to the inputting of the cell CAe and that the cell CAe is therefore eliminated. The symbol "—" in the squares of the table shown in FIG. 7 indicates that the corresponding signal or bit may be in any state whatever.

What we claim is:

1. A communication system including an asynchronous time-division network for enabling communications between a plurality of terminals (TE) in a no-connection mode, said system comprising:
   (1) management means (GA) connected with each of said terminals via said network for establishing a virtual communication ring connecting a group of said terminals (TE1-TE4) for communication in the no-connection mode, thereby to afford the transmission between said group of terminals of first data cells containing blocks of information, said management means being operable in response to ring connection/disconnection requests received from said plurality of terminals for the routing of said first data cells in said virtual ring; and
   (2) distributed means distributed in said plurality of terminals for interfacing said group of terminals with said virtual ring, including:
      (a) transmitting means located in each of said plurality of terminals receiving unfilled first data cells and filled first data cells for transmitting, in response to blocks of information (BI) to be transmitted and source and destination addresses (AS, AD), filled first data cells which are formed by filling said received unfilled first data cells with said blocks and addresses;
      (b) regulating means located in one of said plurality of terminals for regulating the rate of said first data cells in said virtual ring by producing and eliminating said unfilled first data cells, respectively, as a function of the result of a measurement of the rate in the ring; and
      (c) controlling means located in said one terminal for controlling said first data cells carried in said virtual ring, thereby preventing said first data cells from performing more than a predetermined number of laps in said virtual ring.

2. The communication system defined in claim 1, wherein said first data cells have a set length and are transmitted in said virtual ring according to a single transmission direction.

3. The communication system claimed in claim 1, wherein said distributed means further includes for each of said plurality of terminals:
   (d) demultiplexing and multiplexing means for separating said first data cells of said virtual ring from second data cells not belonging to said virtual ring and carried by a same asynchronous time-division multiplex way of said network;
   (e) means for detecting and receiving said first data cells destined for said ring-connected terminal;
   (f) means for reading and memorizing in chronological order of arrival blocks of information and destination addresses read in said first data cells received; and
   (g) means for retransmitting in said virtual ring the first data cells which are filled and destined for other ring-connected terminals.

4. The communication system claimed in claim 3, wherein said regulating means is operable to regulate the rate transmitted by said terminal by setting an upper limit to the number of filled first data cells transmissible per unit of time from said terminal.

* * * * *